Nov. 28, 1933.  F. C. SMITH  1,937,445
REACTION TIMER
Filed June 1, 1931
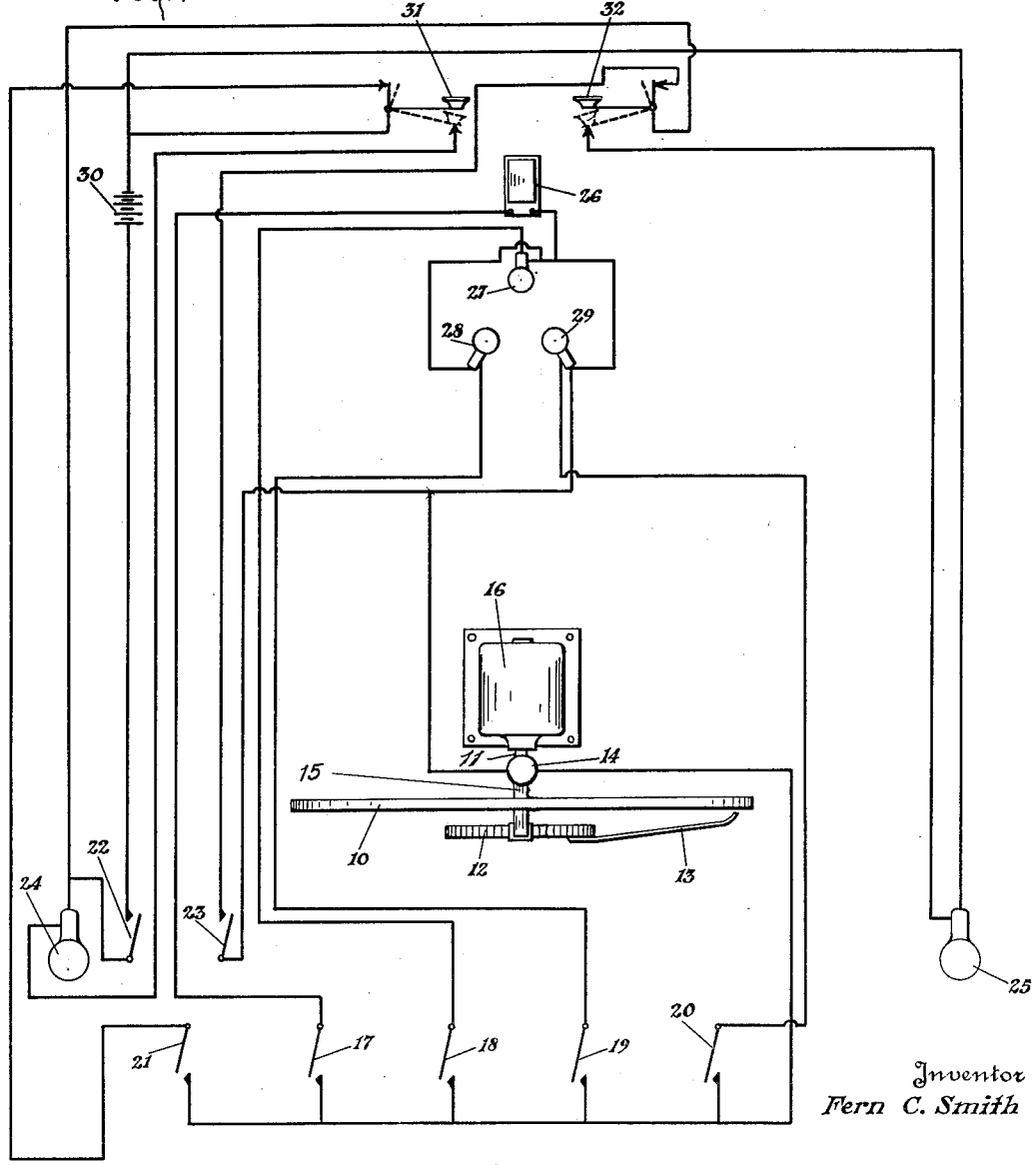
Inventor
Fern C. Smith
By Emil F. Lange
Attorney Patented Nov. 28, 1933

1,937,445

UNITED STATES PATENT OFFICE 1,937,445

REACTION TIMER

Fern C. Smith, Lincoln, Nebr.

Application June 1, 1931. Serial No. 541,316

3 Claims. (Cl. 161—15)

My invention relates to reaction timers, its primary object being the provision of a device for accurately and quickly measuring mental reactions.

Another of my objects is the provision of a dial measuring time intervals, an indicator being movable over the dial and having mechanism for almost instantly starting and stopping the movement of the indicator.

More specifically, it is my object to provide an indicator having a friction drive and movable over a dial, a brake being supplied for normally preventing movement of the indicator except during the time interval between a signal and the subject's response.

Another object which I have in view is the provision of visual indicators for the convenience of the operator.

Another of my objects is the provision of a device having a plurality of visual and audible signals which may be given either singly or in any desired combination.

Another object of the invention is the provision of means whereby the subject may respond selectively to any given signal or combination of signals.

My device is to be operated electrically and it is therefore my object to provide a system of electrical circuits from a single source of power and so designed that the operator may give any desired signal and so that the subject may give his response to the signal without distracting the attention of the subject to other matters, the signals and responses being given in rapid succession.

Having in view these objects and others which will be pointed out in the following description, I will now refer to the drawing, in which Figure 1 is a wiring diagram of the electrical circuits in my reaction timer.

Figure 2 is a view in front elevation of the upper portion of the dial and showing also the indicator and the brake for stopping the movement of the indicator.

The dial 10 shown in Figure 2 is circular and it is divided circumferentially into time intervals. At the center of the dial is a shaft 11 having a disc 12 carrying a pointer 13. The rotation of the shaft 11 with the disc 12 causes the pointer 13 to rotate about the shaft 11 as an axis. The time intervals may be of any desired duration, the present device being so constructed that the pointer 13 moves through one complete revolution in one second. The dial 10 is calibrated to hundredths or thousandths of a second. This, however, may be varied at will in case it is desired to measure other time intervals.

The disc 12 is corrugated or roughened on its peripheral surface. The drive is frictional so that the disc 12 may be stopped at any point without disturbing the operating mechanism for driving the shaft 11. The disc 12 has a frictional relation with the shaft 11 so that the disc will be rotated by the shaft until braking pressure is applied to the periphery of the disc whereupon the rotation of the shaft will continue without rotation of the disc. Immediately behind the dial 10 is an electromagnet 14 having an armature 15 which functions as a brake shoe. When the brake shoe 15 is in the position shown in Figure 2, the disc 12 is held against rotation but it will be obvious that when the magnet 14 is energized the brake shoe 15 will be lifted away from the peripheral surface of the disc 12. The brake shoe 15 may be held in its operative position under its own weight which may be reinforced by the application of a spring having relatively light tension which may be overcome by the attraction of the magnet 14. The disc 12 and the pointer 13 are driven by a spring motor or other motor of any desired type. Such spring motors are of very common construction and it is believed to be unnecessary to provide detailed illustration since almost any spring motor could be adapted for use with my device. The spring motor is shown in conventional form at 16 in Figure 1.

The device is preferably arranged in the form of a cabinet which is interposed between the operator and the subject so that neither can see the other. Facing the operator are a number of signal switches for giving audible and visible signals, such as the buzzer switch 17, a red light switch 18, a white light switch 19, and a green light switch 20. The circuit is also provided with a master switch 21, with a control switch 22 and with a push button 23 also within convenient reach of the operator. Two pilot lights 24 and 25 also face the operator on either side to the right and left. These are preferably provided with colored bulbs such as green and red respectively. The switches 17, 18, 19, and 20 are connected in shunt circuits with the buzzer 26, the red bulb 27, the white bulb 28, and the green bulb 29. The source of power for all of the circuits is shown at 30. This may be a battery of any desired type which is installed in the cabinet or it may be any accessible lighting circuit.

The lights 27, 28, and 29 are on the side of the cabinet visible to the subject. The buzzer 26 may be positioned anywhere within sound of the subject. The object, of course, is to provide means whereby the operator may give any signal or combination of signals which the subject may cut off in order to determine his reaction time to the signal or combination of signals. The circuits from the source of power 30 are so arranged that this may be done. Assuming that the master switch 21 and the control switch 22 are closed, the operator need merely push the button 23 in order to energize the magnet 14 to release the brake shoe 15 which will then cause the pointer 13 to rotate but this circuit does not give any signal. The switches 21 and 22 are, however, kept closed while the instrument is ready for use so that any desired signal may be given by pushing on the button 23 to close the switch. If, for example, it is desired to give the audible signal through the buzzer 26, all that is necessary is to close the switch 17 and to push the button 23 whereupon the brake shoe 15 is released and the buzzer is simultaneously operated. As long as the buzzer circuit is closed, the buzzer and the timing mechanism will both be in operation. If the subject is to respond to a red light signal, the switch 18 is closed and the button 23 is pushed whereupon the timing mechanism is set in operation and the red light 27 is flashed on to a desired screen. The same thing is true with a white light or a green light which may be energized by closing the switch 19 or the switch 20 respectively and then pushing the push button 23. A combination of these signals may readily be given by closing the appropriate switches. For example, if it is desired to give a green light signal together with an audible signal it is only necessary to close the switches 17 and 20 and then to push the button 23.

On the opposite side of the instrument are two buttons 31 and 32 which each actuate two-way switches. The buttons 31 and 32 are within convenient reach of the subject. This gives a dual control for the subject who may be required to actuate either of the switches or to actuate a certain one of the two switches. In both cases the pressing of a button 31 or 32 will break the closed circuit and it will open a circuit through a pilot light 24 or 25 so that the operator can determine instantly if the correct button has been pushed. In any case the current first flows through the magnet 14 and this current is broken by the pushing of the button 31 or the button 32, thus instantly stopping the timing mechanism. At the same time the signal is also cut off.

The above described device enables the operator to give any desired audible or visual signal to which the subject must respond. The operator usually gives a number of false signals which the subject must ignore, paying attention only to the specified signal or specified combination of signals. Response may be made by pressing either the key 31 or the key 32 or he may be required to press a specified one of these two keys. The operator can determine the accuracy in this respect by noting the light which is flashed on in the pilot lights 24 and 25. In any case the timing mechanism is instantly stopped when the subject responds.

The instant stoppage of the timing mechanism is a very important feature of the present invention. Prior instruments for making similar tests are provided with oscillating pointers. The subject's response is usually followed by an oscillatory stoppage of the pointer. This makes it necessary for the operator to wait until the pointer comes to a full stop or else to make a mental calculation of the mean between the oscillations. The present invention avoids this difficulty by stopping the pointer 13 instantly. The value of this feature will be understood from the fact that a number of tests should usually be made in rather rapid succession, the intervals between tests being of short duration so that the subject's mind is not permitted to wander. This can be done with the present instrument by causing the pointer to move forward step by step through a number of tests and then taking the average of these time intervals. For example, the first test might carry the pointer 13 to the point 11 on the dial 10, the second test might carry the pointer on to the point 24 on the dial and the process might be continued through as many tests as would be desired. After one complete revolution has been made the pointer could still move on into or through another revolution, the additions being simple because of the calibrations on the decimal system. Regardless of where the pointer 13 comes to rest, it may be moved back by hand to zero position without disturbing the driving mechanism. This enables the operator to quickly follow with a second test after the previous test has been completed. The tests may be made with the auditory and visual signals individually and in succession and these tests may then be followed by tests involving combinations of the individual signals.

It will thus be seen that I have provided a device for measuring oscillation of series, both auditory and visual, responses of various kinds and intensities, it being understood that the intensity of the sound and light emitted from the buzzer or from the bulbs may be varied at will. The single units of each series are measured in such manner as permits the rapid calculation of the total series and at the same time permits of the computation of the interrelationship of the units of the series. The purpose of the device is for determining the extensity and intensity or the speed and accuracy and oscillation of cognition and conation in psychomotor analysis. The device also measures emotion and fatigue.

The great advantage of my reaction timer is its range and facility of measurement, its simplicity, its portability, and its neat and compact appearance. It is useful in industries in the choice and placement of employees, in laboratories for determining the scientific basis of individual differences, in schools for vocational analysis and choice of life work, by physicians and psychiatrists for the detection of mental abnormalities, by coaches for selecting the superior candidates for winning teams, and by authorities for the selection of safe drivers for motor driven vehicles.

Having thus described my invention in such full, clear, and exact terms that its construction and operation will be readily understood by others skilled in the art to which it pertains, what I claim as new and desire to secure by Letters Patent of the United States is:

1. In a reaction timer, an electrical circuit, a plurality of shunt circuits having audible and visual signal devices of varying intensities, means under the control of the operator for selectively energizing said signal devices and said electrical circuit, a plurality of circuit breaking members under the control of the subject for selective actuation to break all of said circuits, means in said electrical circuit for measuring the time interval between the energizing of a signal device and the breaking of its circuit, said last named means including a plurality of signal devices for indicating to the operator which of said circuit breaking members has been actuated.

2. In a reaction timer, an electrical circuit, a plurality of shunt circuits having audible and visual signal devices of varying intensities, means under the control of the operator for selectively energizing said signal devices and said electrical circuit, a pair of push buttons under the control of the subject for selective actuation to break all of said circuits, means in said electrical circuit for measuring the time interval between the energizing of a signal device and the breaking of its circuit, said last named means including means in said electrical circuit for instantly engaging said measuring device on the breaking of said circuit and for instantly releasing said measuring device into operative condition when any one of said signal devices is energized, and a pair of signal devices for indicating to the operator which of the said two push buttons was actuated.

3. In a reaction timer, an electrical circuit, a plurality of shunt circuits having audible and visual signal devices of varying intensities, means under the control of the operator for selectively or collectively energizing said signal devices and said electrical circuit, a pair of push buttons under the control of the subject for selective actuation to break all of said circuits, means in said electrical circuit for measuring the time interval between the energizing of a signal device and the breaking of its circuit, said last named means including means in said electrical circuit for instantly engaging said measuring device on the breaking of said circuit and for instantly releasing said measuring device into operative condition when any one of said signal devices is energized, and a pair of signal devices for indicating to the operator which of the said two push buttons was actuated.

FERN C. SMITH.